Oct. 9, 1962 D. L. SMITH 3,057,570

TAPE RECORDER CONTROL DEVICE

Filed Aug. 14, 1959 2 Sheets-Sheet 1

INVENTOR

Devon L. Smith

BY Hastings Ackley

ATTORNEY

Oct. 9, 1962

D. L. SMITH 3,057,570

TAPE RECORDER CONTROL DEVICE

Filed Aug. 14, 1959

2 Sheets-Sheet 2

INVENTOR
Devon L. Smith

BY [signature]
ATTORNEY

United States Patent Office 3,057,570
Patented Oct. 9, 1962

3,057,570
TAPE RECORDER CONTROL DEVICE
Devon L. Smith, 2650 Roger Williams Drive, Irving, Tex.
Filed Aug. 14, 1959, Ser. No. 833,883
9 Claims. (Cl. 242—55.12)

This invention relates to control devices and more particularly to a control device for arresting the rotation of one rotatable member upon the cessation of application of a driving force to another rotatable member.

An object of the invention is to provide a new and improved control device for arresting the rotation of one rotatable member upon the cessation of the application of a driving force to another rotatable member operatively associated with the first rotatable member.

Another object is to provide a control device for arresting the rotation of one turntable of a tape using machine upon the cessation of application of a driving force to another turntable of the machine, the tape being pulled off a roll on one turntable and wound into a roll on the other turntable.

Still another object is to provide a control device for a tape using machine having a pair of turntables upon which may be mounted a pair of spools having a tape connected thereto whereby rotation of the turntables and of the spools will cause the tape to unwind from one spool and wind upon another, the control device automatically arresting the rotation of the turntable on which the spool is mounted from which tape is being unwound upon the cessation of the application of a driving force to the other turntable whereby over-running of the unwinding spool is prevented.

A further object is to provide a control circuit for a tape using machine wherein a drive force is applied to the turntable upon which the spool from which tape is being unwound is disposed which tends to rotate the turntable and spool in a direction opposite to that which permits unwinding of the tape from such spool.

A still further object is to provide a control device for a tape utilizing machine having a pair of rotatable members to which spools may be secured and a drive shaft to which the rotatable members may be selectively connected to cause winding of the tape from one spool to another, the control device causing engagement of the unwinding rotatable member with the driving means simultaneously with the disengagement of the winding rotatable member with the driving means whereby overrunning of the unwinding rotatable member and consequent possible fouling of the tape is precluded.

Another object is to provide a control device having a pair of electrically energizable means for energizing one of the electrically energizable means for a predetermined short interval of time simultaneously with the de-energization of the other of the electrically energizable means.

A further object is to provide a control device for use with a tape winding machine wherein one of the solenoids is energized for a predetermined short interval of time upon the de-energization of the other of the solenoids.

A still further object is to provide a control device which includes an electrical charge storage means which is connected across a source of electrical current simultaneously with the energization of one of the solenoids and which is connected to the other of the solenoids upon the de-energization of the first of the solenoids whereby the other solenoid is energized momentarily by the charge from the electrical storage means.

Still another object is to provide a control device for use with a tape winding machine wherein the rotatable members are selectively moved into engagement with the driving means by electrically actuatable means, such as solenoids.

Additional objects and advantages of the invention will be readily apparent from the reading of the following description of a device constructed in accordance with the invention, and reference to the accompanying drawings thereof, wherein.

Figure 1:
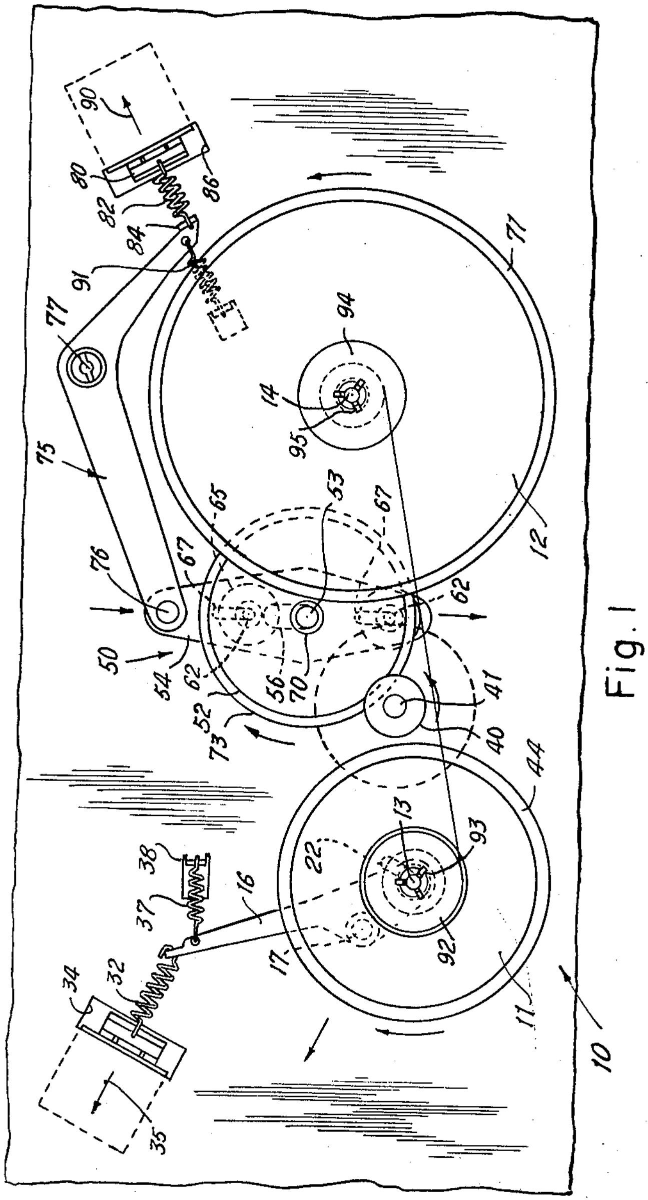
FIGURE 1 is a fragmentary top plan view of a tape winding and unwinding device.
Figure 2:
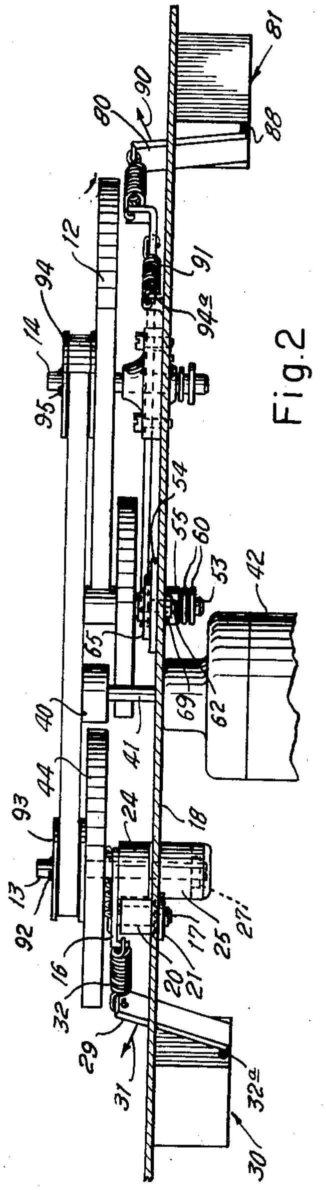
FIGURE 2 is a vertical sectional view of the device illustrated in FIGURE 1.

Referring now particularly to FIGURES 1 and 2 of the drawing, the tape winding device 10 includes a pair of turntables 11 and 12 rigidly secured to the shafts 13 and 14. The shaft 13 of the turntable 11 is mounted on one end of a lever 16 pivotally secured by a pivot pin 17 to the base plate 18. The pivot pin 17 extends through a suitable aperture of the base plate and through a spacer sleeve 20 which supports the lever 16 above the base plate. A split lock or retainer ring 21 disposed in a suitable external recess of the pin 17 below the base plate 18 prevents upward movement of the pivot pin 17 from the base plate.

The shaft 13 of the turntable 11 extends through a suitable slot 22 of the base plate which permits movement of the shaft 13 about the pivot pin 17. The shaft 13 also extends through the spacer sleeves 24 and 25 which are disposed on and abut opposite sides of the base plate adjacent the slot 22. The lever 16 rests on the top end of the upper sleeve. The lower spacer sleeve 25 is secured to the lower end of the shaft 13 by a suitable retainer or lock ring 27 which is receivable in a suitable external annular recess adjacent the lower end of the shaft.

The other end of the lever 16 is connected to the upper end of the operator member 29 of the solenoid 30 by a spring 32 whose opposite ends are hooked through suitable apertures in the lever 16 and the operator member 29. The operator member is pivotally connected by any suitable means, such as the hinge 32*a*, to the solenoid 30 and extends upwardly through a slot 34 of the base plate. The operator member is made of magnetic material so that it will be moved in the direction indicated by the arrow 35 when the winding of the solenoid is energized and will pivot the lever 16 in a counterclockwise direction about the pivot pin 17 as seen in FIGURE 1. The spring 32 is interposed between the operator member and the lever 16 to provide a shock absorbing action and afford a yieldably adjustable connection therebetween.

The lever 16 is biased for movement in a clockwise direction about the pivot pin 17 by a spring 37 whose opposite ends extend through suitable apertures in the lever 16 and the upwardly extending lug 38 of the base plate. The spring 37, when the solenoid 30 is not energized, is effective to move the lever 16 to the position illustrated in FIGURE 1 wherein the outer edge of the turntable is out of contact with the annular drive disk 40 secured to the end of the drive shaft 41 of an electric motor 42. The drive shaft 41 of course extends through a suitable aperture in the base plate 18.

It will be apparent that when the solenoid 30 is energized its operator member is moved toward the solenoid causing the lever 16 to pivot in a counter-clockwise manner about its pivot pin 17 thereby causing the outer edge surface of the turntable, which may be provided by a resilient tire or ring 44, to move into contact or engagement with the outer annular surface of the drive disk 40. The motor 42 is connectable to a source of current and rotates at a constant speed. The drive disk then causes the turntable 11 to rotate in a clockwise direction as seen in FIGURE 1. When the solenoid 30 is de-energized, the force of the spring 37 moves the lever 16 in a clockwise direction about the pin 17 and moves the outer edge surface 44 of the turntable 11 out of engagement with the drive disk 40.

The turntable 12 of the tape winding 10 is selectively connectable to the drive shaft 41 of the prime mover electric motor 42 by a speed reducing transmission 50 which includes a drive wheel 52 rigidly mounted on a shaft 53. The shaft 53 is mounted on a support plate and a hub 55 thereof. The lower portion of the hub extends through an elongated slot 56 of the base plate. The shaft 53 is provided with retainer or lock rings 60 disposed in annular external recesses of the shaft 53 which prevent upward displacement of the shaft through the hub.

The support plate 54 is slidably secured to the base plate 18 by a pair of bolts 62 which extend through the washers 65, through suitable aperatures in the support plate 54 and through the elongate slots 67 of the base plate. The bolts are provided with the usual nuts 69.

It will now be apparent that the support plate 54 may slide on the base plate 18 and is movable between the inoperative position illustrated in FIGURE 1 wherein the drive sleeve 70, rigidly secured to its shaft 53 above the wheel 52 is in engagement with the outer surface of the turntable 71, which may be provided by the resilient tire. Its own outer surface, which may be provided by a tire 73, is then in engagement with the drive shaft 41 of the motor below the drive disk 40.

It will be apparent that when the support plate is moved to a point where the tire 73 of its wheel 52 engages the drive shaft 41 and the drive sleeve 70 of the shaft 53 of the wheel engages the tire 71 of the turntable 12, the turntable is rotated in a counterclockwise manner, as seen in FIGURE 1, at a speed lower than the speed of rotation of the drive shaft 41 since the diameter of the wheel 52 is great compared to the diameter of the drive sleeve 70 and since the diameter of the turntable 12 in turn is great relative to the diameter of the drive sleeve.

The support plate 54 is moved between its operative and inoperative positions by a lever 75 one of whose ends is pivotally secured to one end of the support plate by means of a pivot pin 76 extending through aligned apertures in the support plate and in the lever 75. The pin 76 is slightly smaller than the apertures through which it extends so that a certain lateral movement may take place between the overlapping ends of the support plate and of the lever 75 so that there is no tendency for the pivit pin 76 to bind upon such pivotal movement of the arm.

The lever 75 is pivotally mounted on the base plate 18 by a suitable pivot pin 77 which is rigidly secured to the base plate. The end of the lever 75 remote from the pin 76 is connected to the operator member 80 of the solenoid 81 by a spring 82 whose opposite ends are hooked through suitable apertures in the upstanding lug 84 of the lever 75 and in the upper end portion of the operator member 80. The operator member 80 extends downwardly through a slot 86 of the base plate 18 and is pivotally secured by any suitable means, such as a hinge 88, to the solenoid 81 which in turn is secured by any suitable means to the underside of the base plate.

It will be apparent that when the solenoid 81 is energized it causes the operator member 80, which may be of magnetic substance such as iron or steel, to be pivoted in the direction indicated by the arrow 90 to cause the arm 75 to pivot in a counter-clockwise manner about its pivot pin 77 and cause the drive sleeve 70 to move into engagement with the turntable 12 and cause the drive wheel 52 to move into engagement with the drive shaft 41 of the electric motor. The lever 75 is pivoted in a clockwise manner about its pin 76 to the position illustrated in FIGURE 1 when the solenoid 81 is de-energized by a spring 91 whose opposite ends are hooked through suitable apertures in the arm 75 and in an upstanding lug 94*a* of the base plate.

It will thus be seen that by selectively energizing the solenoids 30 and 81, the turntable 11 may be caused to rotate in a clockwise manner and the turntable 12 may be caused to rotate in a counter-clockwise manner. In normal use, only one of the solenoids 30 or 81 is energized at any one particular time. The turntables 11 and 12 may be used in such tape utilizing devices as dictating or recording machines.

A roll of tape which is to be unwound and moved past the recording head of such dictating or recording machines may be mounted on the turntable 11 with the shaft 13 extending through the spool 92 thereof in the usual manner. The shaft may be provided with drive vanes 93 which are adapted to extend through correspondingly positioned radially extending slots of the spool to cause the spool to rotate with the shaft. One end of the tape is of course secured to the spool 92. The opposite end of the tape may be connected to another spool 94 which may be disposed on the wind turntable 12 and about the shaft 14 thereof and be non-rotatably secured thereto in the same manner by the drive vanes 95. The solenoid 81 is then energized to cause the turntable 12 to rotate at a predetermined slow speed, due to the speed reducing action of the transmission 50, to draw the tape past the recording head at a predetermined speed.

When the recording is finished and it is desired to rewind the tape on the spool 92 which is disposed on the rewind turntable 11, the solenoid 81 is deenergized and the solenoid 30 is energized. The deenergization of the solenoid 81 permits the spring 91 to pivot the arm 75 in a clockwise manner about its pivot pin 76 to cause the drive sleeve 70 and the drive wheel 52 to move out of engagement with the turntable and with the drive shaft 41, respectively. Energization of the solenoid 30 then moves the outer surface 44 of the rewind turntable 11 into engagement with the drive disk 40 of the drive shaft of the electric motor. The rewind turntable then rotates at a a high speed to rewind the tape from the spool 94 disposed on the wind turntable 12 to the spool 92 which is secured to the shaft 13 of the rewind turntable. In the event that for some reason the solenoid 30 is de-energized, clockwise rotation of the rewind turntable 11 will stop or slow down but the turntable 12 and any spool of tape thereon may be continue to rotate at a relatively high speed causing the tape to unwind therefrom and foul in the recording head or other associated elements of the dictating or recording device. It is therefore very desirable that the rotation of the turntable 12 stop immediately upon the de-energization of the solenoid 30.

The solenoid winding 30*a* of the solenoid 30 is connectable across the electric input contacts 100 and 101, which may be connected to any suitable source of current, through the conductor 102, a movable relay contact 104 which is engageable with a stationary contact 105, the conductor 106 which connects the stationary contacts 105 and 107, the movable contact 108 which engages the stationary contact 107 and the conductor 110.

A resistor 111 may be connected across the relay contacts 104 and 105 so that the relay winding will remain energized once the movable contact 108 of the switch has been moved into engagement with the stationary contact 107 even though the normally closed movable contact 104 is moved to its open position by the action of the solenoid winding 30*a* once the latter is energized. The movable contact 104 and stationary contact 105 are provided because the solenoid winding 30*a* initially requires a large surge of current to move its magnetic operator member 29 toward operative position although the amount of current required, once the operator member has been moved by the solenoid to its operative position, is decreased due to the fact that the reluctance of the magnetic flux path between the operator member and the solenoid winding is decreased. The flow of current through the solenoid winding 30*a*, after the movable contact 104 moves to open position, is decreased due to the resistance of the resistor 111 but is sufficiently great to keep the operator member 29 in its operative position holding the turntable 11 in engagement with the drive disk 40.

The solenoid winding 81*a* is connectable across the input terminals 100 and 101 by the conductor 115, the conductor 116, a movable contact 118, the stationary contact 119, the conductor 120, the movable contact 121, the stationary contact 122, the conductor 123, the stationary contact 124, the movable contact 125, and the conductor 126.

The solenoid winding 81*a* is connectable across a capacitor 128 by the conductors 115, 129, 130, the movable contact 131, which is in engagement with the stationary contact 132 when the relay winding 133 is de-energized, the conductors 134 and 120, the stationary contact 119, the movable contact 118 and the conductor 116. The movable contact 118 is normally in a closed position in engagement with the stationary contact 119 and is opened by the solenoid winding 30*a* when the latter is energized.

The relay winding 133, when energized, moves the movable contact 131 into engagement with the stationary contact 134 to connect the capacitor across the input terminals 100 and 101 through the conductors 115, 129 and 130, the movable contact 131, the stationary contact 134 and the conductor 135. The relay winding 133 which controls operation of the relay contact 131 is energized each time switch 108 is closed through the conductor 115, the conductor 137, the conductor 138, the movable contact 104, the stationary contact 105, the conductor 106, the stationary contact 107, movable switch contact 108, the conductor 110. It will be apparent that if the contact 104 is in its open position, the relay winding 29 is energized through the resistor 111 which is connected across the stationary and movable contacts 104 and 105. If desired, the solenoid winding 81*a* may be connected across the input terminals 100 and 101 through other suitable control circuits which may connect the conductor 140 to the input terminal 101.

The solenoid winding 81*a* moves the normally closed movable contact 121 out of engagement with the stationary contact 122 whenever the conductor 123 is connected to the input terminal 101 through appropriate control circuits to decrease the flow of current through the solenoid winding since a lesser amount of current needs to flow through the solenoid winding once its operator member 80 has moved to its operative position. The low current flow caused by the resistance 145 connected across the relay contacts 121 and 122 is sufficient to hold the solenoid operator member 80 in its operative position. If desired, the solenoid winding 30*a* may be similarly connected to the input terminal 101 through other suitable control circuits through the conductor 147 which is connected to the conductor 106.

In use, when it is desired to cause the wind turntable 12 to rotate and unwind tape from the spool 92 disposed about the shaft 13 and on the turntable 44, the movable switch contact 125 is moved into engagement with the stationary contact 124. As a result, the solenoid winding 81*a* is connected across the input terminals and pivots the lever 75 in a counter-clockwise direction about the pivot pin 76 to cause the drive sleeve 70 of the shaft 53 to engage the turntable 12 and at the same time cause the drive disk 52 to engage the drive shaft 41 of the electric motor 42. As a result, if a spool 92 of tape is disposed on the turntable 11 and has one end connected to the spool 94 disposed on the turntable 12 and about the shaft 14 for rotation therewith, tape will be unwound from the spool on the turntable 11 and will be wound about the spool 94 on the turntable 12 since the turntable 11 of course is free to rotate. As a result, the turntable 12 will rotate in a counter-clockwise manner and the tape will cause the turntable 11 also to rotate in a counter-clockwise manner, as seen in FIGURE 1.

If it is then desired to rewind the tape from the spool 94 to the spool 92, the movable switch contact 108 is moved to closed position which causes the relay solenoid winding 30*a* to be connected across the input terminals 100 and 101.

Energization of the rewind solenoid winding 30*a* causes the relay contact 118 to move into open position so that the solenoid winding 81*a* is simultaneously de-energized. When the rewind solenoid winding 30*a* is energized by the closure of the movable switch contact 108, the auxiliary relay winding 133 is also energized causing the movable contact 131 to move into engagement with the stationary contact 134 thus causing the capacitor 128 to be connected across the input terminals 100 and 101 so that the capacitor is charged with a potential equal to the potential across the input terminals.

Energization of the rewind solenoid winding 30*a* causes its operator member 29 to rotate the lever 16 in a counter-clockwise manner about its pivot pin 17 to cause the turntable 11 to move into engagement with the drive disk 40 of the electric motor 42. As a result, the turntable 44 and the spool 92 disposed on the turntable are caused to rotate at a relatively high rate of speed rewinding the tape on the spool 92 and unwinding it from the spool 94. When the rewind solenoid winding 30*a* is now de-energized by opening the movable switch 108, the de-energization of the solenoid winding 30*a* permits the movable contact 118 to move back to its closed position and at the same time the de-energization of the relay winding 133 allows the movable contact 131 to move into engagement with the stationary contact 132. As a result, the capacitor 128, which is now fully charged, is connected across the solenoid winding 81*a* and momentarily energizes the solenoid winding 81*a* to cause the operator member 80 thereof to cause the arm 75 to again pivot about the pivot pin 77 in a counter-clockwise manner to cause the drive sleeve 70 to engage the turntable 12 and simultaneously cause the drive disk 52 to engage the drive shaft 41. This momentary engagement causes a force to be applied to the turntable 12 which tends to move it in a counter-clockwise manner and thus abruptly stops its rotation in a clockwise manner. As a result, the movement of the turntable 12 is arrested or stopped at the same time that the application of driving force to the turntable 11 is stopped. The action of the transmission 50 actually tends to impart a slight counter-clockwise rotation to the turntable 12 which prevents over-running of the turntable 12 and the unwinding of the tape from the spool 94. Rotation of the turntable 11 is also arrested since the turntables are connected by the tape secured to the spools mounted on the shafts of the turntables. The capacitor however has only sufficient charge to momentarily energize the solenoid winding 81*a* so that the speed reducing transmission 50 only momentarily connects the drive shaft 41 of the motor to the turntable 12 so that when rotation of both turntables is stopped the solenoid 80 is immediately de-energized.

It will now be seen that the control device for arresting rotation of the turntable 12 does not provide merely a braking action to the clockwise rotation of the turntable 12 when the solenoid winding 30*a* is deenergized but actually imparts a force which tends to rotate the turntable in a counter-clockwise direction and that this force opposes and overcomes the inertial forces which tend to continue the clockwise rotation of the turntables.

It will further be seen that the force for arresting clockwise rotation of the turntable 12 is derived from the same electric motor or prime mover 42 which imparts rotation selectively to either of the turntables.

Figure 3:
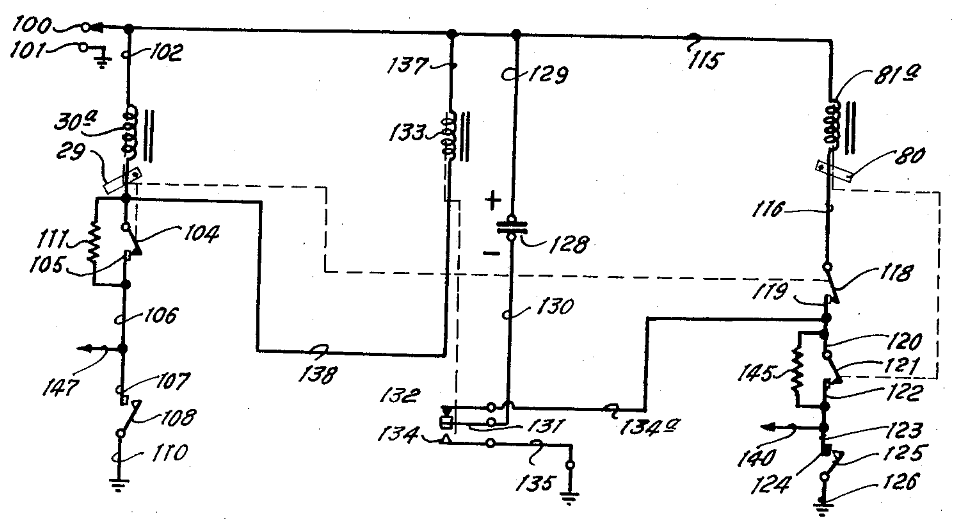
FIGURES 3 is a schematic illustration of the control circuit for the turntables of the tape winding device illustrated in FIGURES 1 and 2; and, FIGURE 4 is a schematic diagram of a modified control circuit for the turntables.
Figure 4:
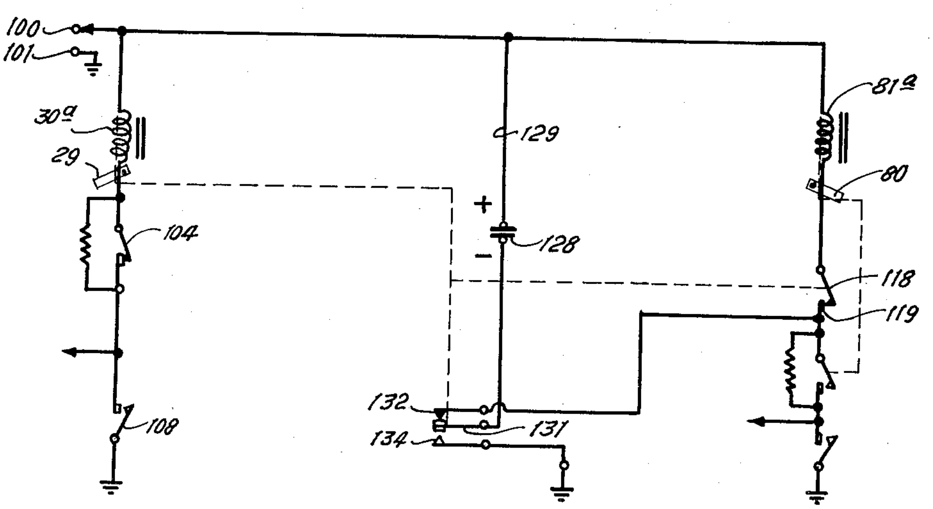

In FIGURE 4 is illustrated a modified form of the control circuit wherein the relay winding 133 is omitted and the movable contact 131 is actuatable by the force of the solenoid winding 30*a*. The solenoid winding 30*a* of the control device illustrated in FIGURE 4, when energized, actuates the operator member 29, opens the movable contact 104, moves the movable contact 131 out of engagement with the stationary contact 132 and into engagement with the stationary contact 134, and moves the movable contact 118 out of engagement with the movable contact 119. It will thus be apparent that the control device illustrated in FIGURE 4 will operate in the identical manner of the control circuit illustrated in FIGURE 3 to connect the electrical storage device or capacitor 128 across the input terminals 100 and 101 when the solenoid winding 30*a* is energized by the closing of the switch 108 and to connect the capacitor across the solenoid winding 81*a* when the solenoid winding 30*a* is de-energized to permit discharge of the charge on the capacitor through the solenoid winding 81*a* which is thus momentarily energized and causes its operator member 80 to move to its operative position wherein the speed reducing transmission connects the drive shaft to the turntable 12 and imparts a force to the turntable 12 which tends to rotate it in a counter-clockwise manner.

It will be apparent that whenever the solenoid 81 is energized, the rotation of the turntable 12 is stopped and, since the turntable 12 is ordinarily connected to the turntable 11 by the tape, the stopping of the clockwise rotation of the turntable 12 will result in the arrestation of the rotation of the turntable 11 so that rotation of both turntables will be stopped.

It will now be seen that a new and improved control device has been illustrated and described for arresting the rotation of one rotatable member, such as the turntable 12, upon the cessation of the application of a driving force to another rotatable member, such as the turntable 12 to permit winding and unwinding of a tape between two spools which are rotatable with the turntables.

It will further be seen that the control device includes a control circuit having an electrical storage means or capacitor 128 which is charged to predetermined potential when one electrically energizable means, such as the solenoid winding 30*a*, is energized to cause a driving force to be applied to one turntable, such as the turntable 12, and which is connected across the electrically energizable means, such as the solenoid winding 81*a*, to cause the application of a driving force to the other turntable 12 for a predetermined short interval of time.

It will further be seen that the control device not only applies a braking force to stop rotation of the turntable 12 but also actually applies a force which tends to rotate the turntable 12 in the opposite direction so that over-running of the turntable 12 when the application of the driving force to the other turntable 11 is stopped is completely prevented.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A device including: a pair of simultaneously rotatable members; driving means; means for selectively connecting each of said rotatable members to said driving means, said rotatable members being connectible by a flexible tape member whereby when either of said rotatable members is connected to said driving means and is rotated by the driving means, the other rotatable member is also rotated; and means operatively associated with said connecting means for momentarily causing connection of one of said rotatable members to said driving means upon the disconnection of the other of said rotatable members from said driving means to arrest rotation of said one of said rotatable members.

2. A device including: a pair of separately rotatable members; driving means; means for selectively connecting each of said rotatable members to said driving means, said rotatable members being connectible by a flexible tape member whereby rotation of one of said rotatable members by said driving means causes simultaneous rotation of the other of said rotatable members; and means operatively associated with said connecting means for momentarily causing connection of one of said rotatable members to said driving means upon the disconnection of the other of said rotatable members from said driving means to arrest rotation of said one of said rotatable members, said means for connecting the rotatable members to the driving means including electrically energizable means operatively associated with each of said rotatable members, said means for momentarily causing connection of the other of said rotatable members to the driving means including means for momentarily energizing electrically energizable means of said other of said rotatable members.

3. A device including: a pair of separately rotatable members; a driving means; means for selectively connecting each of said rotatable members to said driving means; means connecting said rotatable members causing each of said rotatable members to rotate when the other rotatable member is connected to said driving means; and means operatively associated with said connecting means for causing momentary connection of one of said rotatable members to said driving means upon the disconnection of the other of said rotatable members from said driving means to arrest rotation of said one of said rotatable members, said means for connecting the rotatable members to the driving means including electrically energizable means operatively associated with each of said rotatable members, said means for causing connection of the other of said rotatable members to the driving means including means for momentarily energizing the electrically energizable means of said other of said rotatable members, said last mentioned means including a capacitor and means for connecting said capacitor across a source of potential when the electrically energizable means of said one of said rotatable members is energized and for connecting said capacitor across the electrically energizable means of said other of said rotatable members upon the de-energization of said electrically energizable means of said one of said rotatable members.

4. A device including: a first rotatable member; a second rotatable member; a drive means; a first electrically energizable means for connecting said first rotatable member to said drive means to cause said first member to rotate in one direction; a second electrically energizable means for connecting said second rotatable member to said drive means to cause said second rotatable member to rotate in a direction opposite to said one direction; means connecting said first and second rotatable members causing each rotatable member to rotate when the other rotatable member is connected to said drive means; and means operatively associated with said first and second electrically energizable means for momentarily energizing said second electrically operable means upon the de-energization of said first electrically energizable means.

5. A device including: a first rotatable member; a second rotatable member; a drive means; a first electrically energizable means for connecting said first rotatable member to said drive means to cause said first member to rotate in one direction; a second electrically energizable means for connecting said second rotatable member to said drive means to cause said second rotatable member to rotate in a direction opposite to said one direction, said first and second rotatable members being connectible by a flexible tape member whereby each rotatable member is caused to rotate when the other rotatable member is connected to said drive means; and means operatively associated with said first and second electrically energizable means for momentarily energizing said second electrically operable means upon the de-energization of said first electrically energizable means, said last mentioned means including a capacitor and connecting means for connecting said capacitor to a source of potential when said first electrically operable means is energized and for connecting said capacitor across said second electrically energizable means when said first electrically energizable means is de-energized.

6. A device including: a first rotatable member; a second rotatable member; a drive means; a first electrically energizable means for connecting said first rotatable member to said drive means to cause said first member to rotate in one direction; a second electrically energizable means for connecting said second rotatable member to said drive means to cause said second rotatable member to rotate in a direction opposite to said one direction; and means operatively associated with said first and second electrically energizable means for momentarily energizing said second electrically operable means upon the de-energization of said first electrically energizable means, said last mentioned means including a capacitor and connecting means for connecting said capacitor to a source of potential when said first electrically operable means is energized and for connecting said capacitor across said second electrically energizable means when said first electrically energizable means is de-energized, said connecting means including a relay contact movable to a first position to connect the capacitor to said potential when said first electrically energizable means is energized and movable to connect said capacitor across said second electrically energizable means when said first electrically energizable means is de-energized.

7. A device including: a first rotatable member; a second rotatable member; a drive means; a first electrically energizable means for connecting said first rotatable member to said drive means to cause said first member to rotate in one direction; a second electrically energizable means for connecting said second rotatable member to said drive means to cause said second rotatable member to rotate in a direction opposite to said one direction; and means operatively associated with said first and second electrically energizable means for momentarily energizing said second electrically operable means upon the de-energization of said first electrically energizable means, said last mentioned means including a capacitor and connecting means for connecting said capacitor to a source of potential when said first electrically operable means is energized and for connecting said capacitor across said second electrically energizable means when said first electrically energizable means is de-energized, said connecting means including a relay contact movable to a first position to connect the capacitor to said potential when said first electrically energizable means is energized and movable to connect said capacitor across said second electrically energizable means when said first electrically energizable means is de-energized, said electrically energizable means being solenoids.

8. A device including: a first rotatable member; a second rotatable member; a drive means; a first electrically energizable means for connecting said first rotatable member to said drive means to cause said first member to rotate in one direction; a second electrically energizable means for connecting said second rotatable member to said drive means to cause said second rotatable member to rotate in a direction opposite to said one direction; and means operatively associated with said first and second electrically energizable means for momentarily energizing said second electrically operable means upon the de-energization of said first electrically energizable means, said last mentioned means including a capacitor and connecting means for connecting said capacitor to a source of potential when said first electrically operable means is energized and for connecting said capacitor across said second electrically energizable means when said first electrically energizable means is de-energized, said connecting means including a relay contact movable to a first position to connect the capacitor across said potential when said first electrically energizable means is energized and movable to connect said capacitor across said second electrically energizable means when said first electrically energizable means is de-energized, said electrically energizable means being solenoids, said movable contact being movable by the solenoid of said first electrically energizable means to said first position when said solenoid is energized.

9. A device including: a first rotatable member; a second rotatable member; a drive means; a first electrically energizable means for connecting the said first rotatable member to said drive means to cause said first member to rotate in one direction; a second electrically energizable means for connecting said second rotatable member to said drive means to cause said second rotatable member to rotate in a direction opposite to said one direction; and means operatively associated with said first and second electrically energizable means for momentarily energizing said second electrically operable means upon the de-energization of said first electrically energizable means, said last mentioned means including a capacitor and connecting means for connecting said capacitor to a source of potential when said first electrically operable means is energized and for connecting said capacitor across said second electrically energizable means when said first electrically energizable means is de-energized, said connecting means including a relay contact movable to a first position to connect the capacitor to said potential when said first electrically energizable means is energized and movable to connect said capacitor across said second electrically energizable means when said first electrically energizable means is de-energized, said electrically energizable means being solenoids, said movable contact being movable by the solenoid of said first electrically energizable means to said first position when said solenoid is energized, and a relay winding energized when the solenoid of said first electrically energizable means is energized to move said movable contact to said first position.

References Cited in the file of this patent

UNITED STATES PATENTS

| | | |
|---|---|---|
| 2,081,032 | Bird | May 18, 1937 |
| 2,304,913 | Herzig | Dec. 15, 1942 |
| 2,427,750 | Snyder | Sept. 23, 1947 |
| 2,504,587 | Rey | Apr. 18, 1950 |

FOREIGN PATENTS

| | | |
|---|---|---|
| 313,672 | Great Britain | June 20, 1929 |